Sept. 29, 1959     J. O. EDSON ET AL     2,906,955
DERIVATION OF VOCODER PITCH SIGNALS
Filed Feb. 17, 1956     3 Sheets-Sheet 1

INVENTORS J. O. EDSON
C. B. H. FELDMAN
BY Harry C. Hart
ATTORNEY

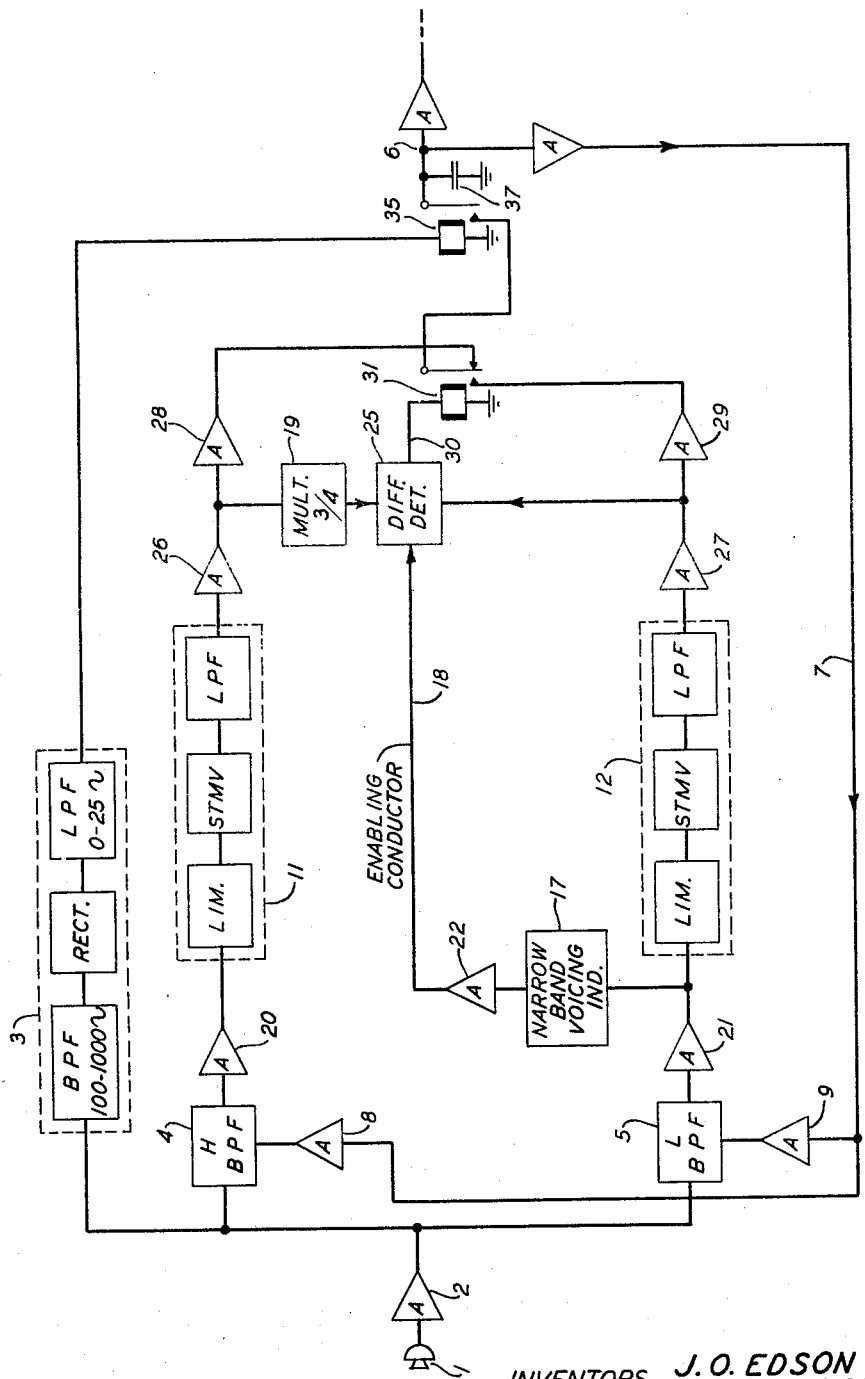

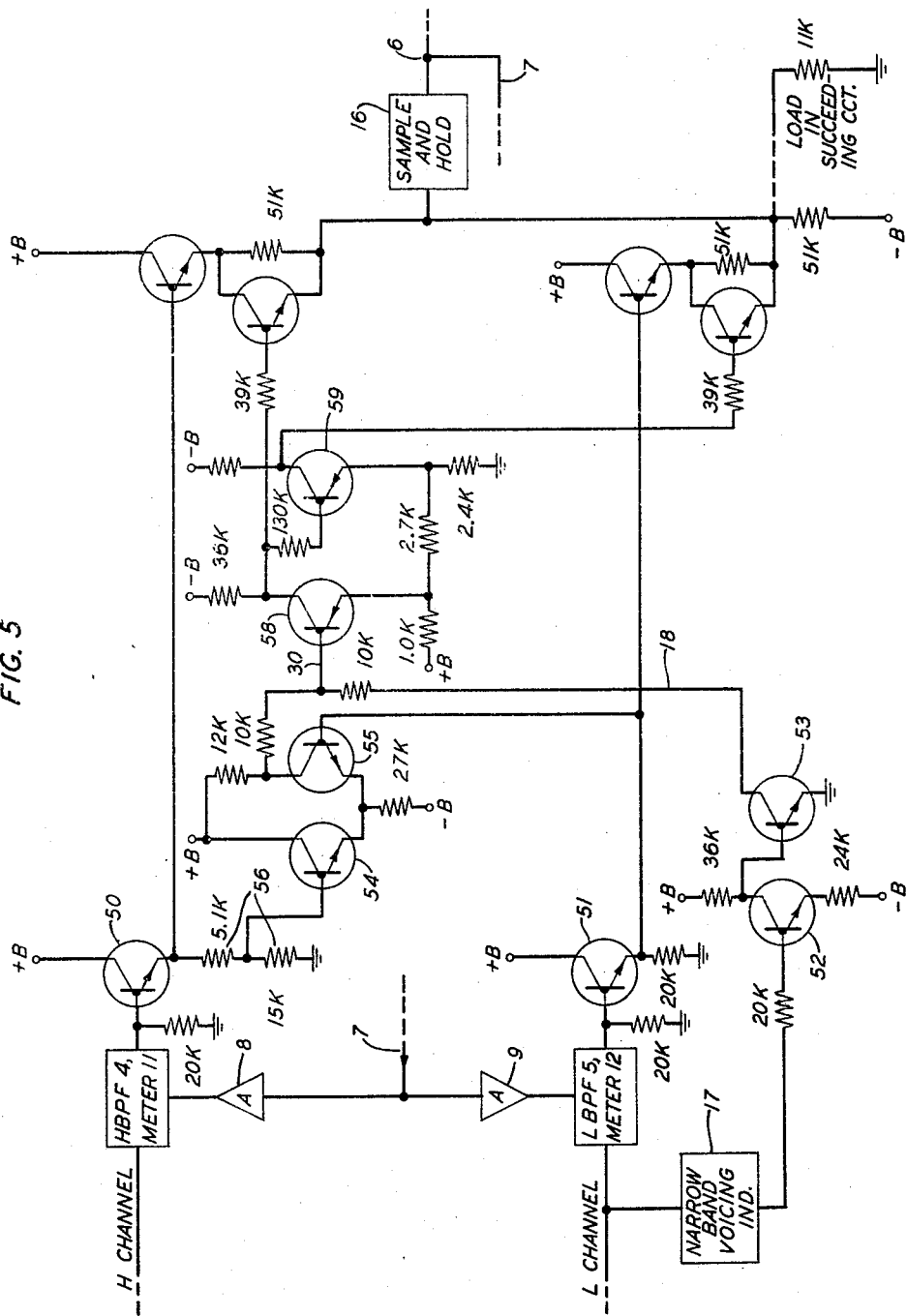

United States Patent Office 2,906,955
Patented Sept. 29, 1959

2,906,955

DERIVATION OF VOCODER PITCH SIGNALS

James O. Edson, Oxford, and Carl B. H. Feldman, Summit, N.J., assignors to Bell Telephone Laboratories, Incorporated, New York, N.Y., a corporation of New York Application February 17, 1956, Serial No. 566,153

10 Claims. (Cl. 324—77)

This invention relates to electrical communication and particularly to the derivation from a complex signal such as speech of a significant index of its characteristics for transmission to a remote point where it may be utilized to control the reconstruction of the signal.

A primary object of the invention is to improve the accuracy and reliability of determinations of the fundamental frequency or pitch of a signal, e.g., a voice signal to be transmitted. A related object is to carry out such pitch determinations even while the pitch itself is changing.

Signal analyzing and synthesizing systems of the so-called "vocoder" type are well known wherein the information content of a signal such as a speech wave is extracted in the form of a number of slowly varying unidirectional currents or voltages which are then used to control the operation of synthesizing apparatus in reconstructing the original wave. Systems of this class form the subject of H. W. Dudley Patents 2,151,091 and 2,243,527, as well as other patents and publications.

For the reconstructed speech to have a natural and realistic character, it is essential in such a system to carry out an accurate determination of the fundamental frequency or pitch of the speech wave, to derive an unambiguous indication thereof for use as a control signal in the reconstruction apparatus, and to do so continuously.

In the past various approaches to this problem of pitch determination have been proposed. A common procedure has been to employ wave filter apparatus to segregate the fundamental component from all other components, and then to employ a frequency measuring device, hereinafter termed a meter, such as a cycle counter, to provide an indication of the frequency of the energy passing through the filter, and to utilize this indication continuously to tune the filter to the frequency indicated, thus to follow or track it in the course of its variations. Aside from modifications of detail, the output indication of the frequency meter has usually been accepted as a measure of the voice pitch, which is not necessarily the same as the frequency indicated.

The construction of a reliable system of this character has always presented a difficult problem to the engineer. Many voices are so rich in harmonic content that the energy of the fundamental component is small in comparison with the harmonic energy, and is therefore difficult to segregate. Under some conditions the energy at the fundamental frequency disappears entirely and recourse is sometimes had to some indirect approach such as the intermodulation of adjacent harmonic components, to derive a difference frequency. Aside from the complexities entailed, such difference frequency is a true measure of the voice pitch only in the case of a steady sound. The normal variations of frequency and of phase of the intermodulated components in the course of inflection causes such instantaneous frequency to be inadequate for the purpose.

In a sense the root of the difficulty lies in the fact that prior art systems have imposed two incompatible requirements on the pitch tracking filter. The first requirement is that its passband shall be sufficiently narrow to discriminate on the low frequency side against noise and on the high frequency side against harmonics. The second requirement is that the filter shall recognize the fundamental pitch component whenever it is present. When the filter is designed to meet the first requirement, and when it happens momentarily to be tracking the second or third harmonic of the speech, it is quite insensitive to the return of the fundamental pitch component, which now lies outside of its field of view: below its passband. Hence it fails to meet the second requirement.

The present invention overcomes this difficulty by the provision, in addition to a tracking filter which may be conventional, of means for monitoring that part of the frequency range which lies below the frequency instantaneously being tracked by approximately one octave. When a substantial voice component is found in this frequency range by the monitoring apparatus, and the frequency of this component is lower than the one being tracked, the invention provides means for tuning the tracking filter downward along the frequency scale to such a point that it may now recognize and seize this newly found voice component of lower frequency, and proceed to track it. If, in the situation described, the newly found component lies just one octave below the tracked component, then the tracked component must have been the second harmonic of the pitch frequency and the newly found component must have been the fundamental pitch frequency component itself. If the frequency of the newly found component is two-thirds that of the tracked component, the latter must itself have been the second harmonic while the tracked component must have been the third harmonic. In this event the downward tuning operation first retunes the main filter downward to embrace the second harmonic, whereupon the monitoring apparatus recognizes the fundamental frequency, if present, and the first operation is repeated.

The monitoring apparatus may conveniently comprise an auxiliary tunable bandpass filter so proportionad that its passband always lies one octave below that of the main tacking filter, being sufficiently wide to recognize and respond to a returning voice component lying below the tracked component.

This lower frequency component, thus accepted by the auxiliary filter, is measured by a frequency-measuring device or meter coupled to the filter, and the frequency meter delivers a control signal representing its frequency. Through the agency of a selecting device, this control signal, if it represents a lower frequency than the original control signal, now replaces the original control signal derived from the main tracking filter, both as an output pitch control signal for transmission to a distant point, and as a feedback control signal for retuning both filters.

Application of the same control signal to the tuning control points of both filters ensures that the movements of their passbands on the frequency scale shall always take place concurrently and in the same sense while preserving the octave relation between their mid-frequencies. The control signal which carries out these tuning operations is advantageously derived from the output terminal of the apparatus and applied to the filters by way of a feedback path.

To prevent the down-tuning operation from taking place when a large amount of unvoiced energy, e.g., noise, lies within the band of the auxiliary filter a voicing indicator is advantageously employed to restrict the operations described above to those situations in which voice energy is found in the passband of the auxiliary filter.

Because of the monitoring function of the auxiliary filter, and the fact that it is only called into action as the need arises and relinquishes control to the main filter as soon as it has positioned the passband of the latter properly on the frequency scale, it has been termed a "watch-dog" filter.

Between voiced sounds there is no pitch to be tracked. It has been determined from statistical examination of many speech sounds that when voicing returns, after an interval of no voicing, the most probable new value of the fundamental pitch frequency is near its most recent previous voiced sound value. Hence, provision is made to hold the filter tuning control signal at its latest value throughout each ensuing unvoiced interval. Such signal holding apparatus may be as described in an application of H. L. Barney, Serial No. 459,333, filed September 30, 1954, now matured into Patent 2,819,341, granted January 7, 1958.

The invention will be fully apprehended from the following detailed description of illustrative embodiments thereof, taken in connection with the appended drawings in which:

Fig. 3 is a block schematic diagram illustrating a preferred embodiment of the invention; and Figs. 4 and 5 are schematic circuit diagrams showing the details of parts of Fig. 3.

Figure 1:
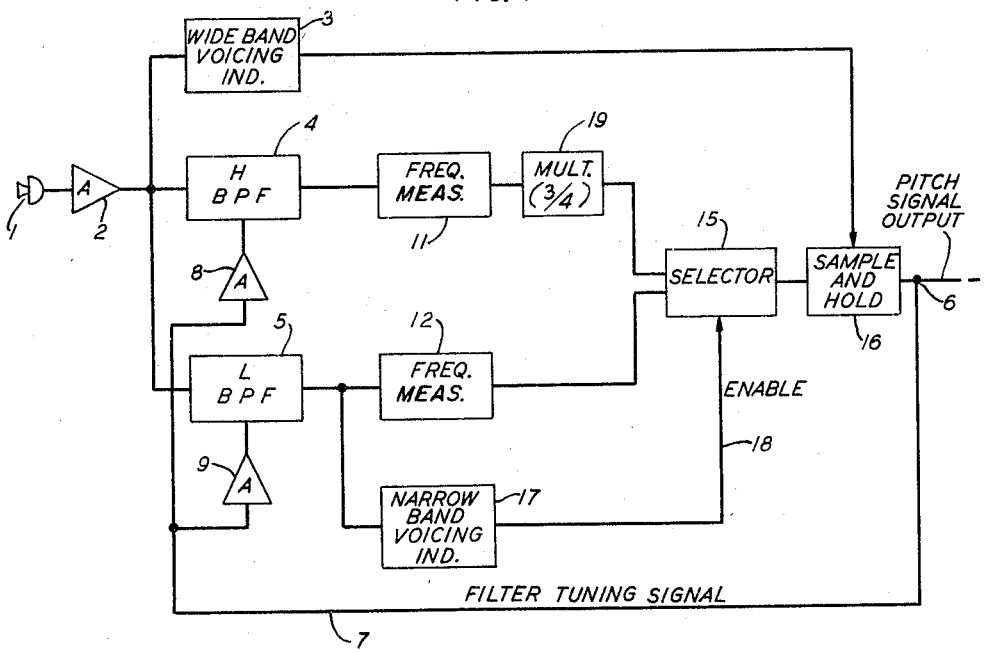
Fig. 1 is a block schematic diagram showing a simplified embodiment of the invention.

The functions and operations of the apparatus to be described are revealed in the block schematic diagram of Fig. 1, wherein a wave originating for example, in a speech source such as a microphone 1 is applied in parallel by way of an amplifier 2 to a voicing indicator 3, a first tunable bandpass filter 4 and a second tunable bandpass filter 5. The first of these, designated H, is the main tracking filter of the system and the second, designated L, is the auxiliary "watch-dog" tracking filter. These filters are controlled in common by a tuning signal derived from the output terminal 6 of the apparatus and fed back over a conductor 7, the controls being isolated from each other as by buffers 8, 9. A first frequency measuring device or meter 11 is connected to the output terminal of the main filter 4 and a second frequency meter 12 is connected to the output terminal of the auxiliary filter 5. The output terminals of these two frequency meters are connected to two input points of a selector 15 whose function is to choose between them in the fashion to be described and to connect the chosen one by way of a sample-and-hold circuit 16 to the output terminal 6 of the apparatus as a whole, from which the feedback control signal is derived.

Figure 2:
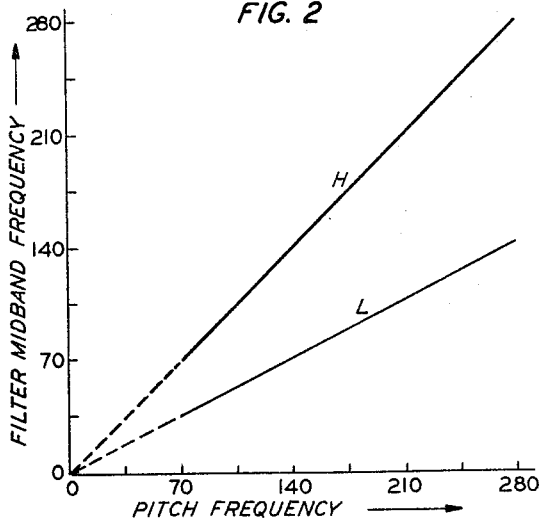
Fig. 2 is a diagram showing the relation between the frequencies to which the filters of Fig. 1 are tuned and a control signal.

In practicing the invention the main filter 4 and the auxiliary filter 5 are to be so proportioned that the frequencies of their passbands, for each single value of the tuning signal applied to them, are as shown in the curves designated H and L, respectively, of Fig. 2, wherein it is seen that for any value of the pitch frequency the main filter is tuned to the same frequency and the auxiliary filter is tuned one octave below the main filter.

The selector 15, more fully described below, is so constructed that when the output of the upper frequency meter 11 substantially exceeds that of the lower one 12 and when a narrow band voicing indicator 17 indicates that the energy in the watch-dog channel is of a "voiced" character, the selector 15 chooses the lower one and connects it through the sample-and-hold circuit 16 to the output terminal 6. When, on the other hand, the output of the lower frequency meter 12 exceeds a corresponding relative threshold and when, at the same time, the narrow band voicing indicator 17 indicates that the energy in the watch-dog channel is of a "voiced" character, and delivers an enabling signal over a conductor 18 to the selector 15, the selector 15 makes the opposite connection, thus establishing a path from the upper frequency meter 11 through the sample-and-hold circuit 16 to the output terminal 6.

When the selector 15 operates in accordance with this rule, it will be apparent that the results, for various situations, are as follows:

Assume, first, that the main filter 4 is, at the moment, correctly tracking the fundamental pitch component. The passband of the auxiliary watch-dog channel filter 5 is then centered an octave below the fundamental on the frequency scale. Assume also that the energy passing through the auxiliary channel is dominated by noise. Under this condition the output of the narrow band voicing indicator 17 vanishes and the selector 15 is disabled. The main channel then continues to track the fundamental component correctly, as long as its energy suffices to actuate the frequency meter 11.

But suppose that the fundamental component momentarily disappears. In this event the main tracking filter 4 may seize, hold, and track the second harmonic, or even the third. This is a situation which has in the past bedevilled vocoder transmission systems because it makes for a sudden upward shift in the pitch of the reconstructed voice by an octave or more, making each speaker sound like an adolescent boy whose voice suddenly breaks from bass to treble. Now when this situation arises in the present apparatus, the instant the energy of the fundamental component returns, it appears in the auxiliary watch-dog channel. Because its frequency is one-half the frequency of the second harmonic being tracked, the output of the upper frequency meter 11 is substantially twice as great as that of the lower one 12. The voicing indicator 17 recognizes the energy in the auxiliary channel as being produced by voiced speech, and enables the selector 15 to carry out its assignment, namely, to establish a connection from the auxiliary frequency meter 12 to the output conductor 6. This rapidly restores the outgoing pitch signal to its proper value. At the same time it reduces the feedback tuning control signal on the conductor 7 by a factor two; i.e., to one-half its preceding magnitude. Thereupon downward tuning of both tunable filters 4, 5 commences. It continues until the high filter 4 is centered on the pitch frequency and the watch-dog channel filter 5, tuned an octave lower, is again on the alert. Thereupon the selector 15 reestablishes the original connection from the upper frequency meter 11 to the output conductor 6.

A frequency meter 11 or 12, of the sort employed in the present apparatus is controlled solely by the frequency component which is largest in amplitude. If two or more components of different frequencies are present the largest one alone determines the output indication, except over a small amplitude range in which the components are almost exactly equal in magnitude. Hence, when the down-tuning described above takes place, the main filter 4 soon reaches a position at which the fundamental begins to appear within the passband although still attenuated by the selectivity of the filter 4. This may be as much as half an octave above the final tuning position, for example. By virtue of the selector 15, however, the tuning control signal indicates the need to center the passband of the main filter 4 on the fundamental frequency. Hence down-tuning proceeds until the correct final position is reached.

To enable the selector 15 to have the greatest operating margin it is advantageous to apply to it the entire output voltage of the watch-dog channel frequency meter 12 but only 70 to 80 percent of the output voltage of the main channel frequency meter 11. Then when both channels respond to the same frequency, the choice between signals is clear. Likewise, when the main channel responds to a harmonic and the watch-dog to a lower harmonic the apparatus can make the correct selection decisively. To this end a multiplier 19 is included in the path from the upper frequency meter 11 to the selector 15. It may be of any desired construction, and its function is simply to reduce the main channel frequency output signal to three-quarters of its original value before application to the selector. The manner in which these adjustments provide decisiveness of operation is revealed in the following table.

| Main (H) Channel | | Auxiliary (L) Channel | | Margin (Volts) |
|---|---|---|---|---|
| Component Frequency | Meter Output (Volts) | Component Frequency | Meter Output (Volts) | |
| $f$ | 0.75 | $f$ | 1.0 | 0.25 |
| $2f$ | 1.5 | $f$ | 1.0 | 0.5 |
| $3f$ | 2.25 | $2f$ | 2.0 | 0.25 |

It is advantageous, during and throughout the progress of each unvoiced sound, to hold the latest voiced sound value of the pitch control signal. To this end, there is interposed between the selector of Fig. 1 and the output conductor 6 of the apparatus a sample-and-hold circuit 16 which may be of any desired construction. It is controlled by the output of the wide band voicing indicator 3 to which the original speech energy is applied.

Fig. 3 shows the same apparatus as Fig. 1 in greater detail. As in Fig. 1, the output signal of a complex wave source such as a microphone 1 is applied by way of an amplifier 2 to a main trouble bandpass filter 4, designated H, and to an auxiliary tunable bandpass filter 5, designated L. This filter is the principal element of the watch-dog channel. The tuning of both of these filters is controlled in the fashion described above by a tuning control signal derived from the output terminal 6 of the apparatus. The upper frequency meter 11 of Fig. 1 is indicated in Fig. 3 by a broken line box and may comprise a limiter, a single trip multivibrator and a low-pass filter connected together in the order named. The lower frequency meter 12 may contain similar elements. The narrow band voicing indicator 17 receives the energy passing through the auxiliary filter 5 by way of an amplifier 21 and, by way of another amplifier 22, delivers control energy over the enabling conductor 18 to a differential detector 25. This differential detector 25 receives on its upper input terminal a signal derived through an amplifier 26 from the upper frequency meter 11 and reduced in magnitude by the multipler 19, e.g., an attenuator, to three-fourths of its original magnitude. The differential detector 25 receives on its lower terminal, and through a similar amplifier 27, the full magnitude of the output of the lower frequency meter 12. The outputs of the frequency meters 11, 12 as thus amplified are also passed through buffers 28, 29 to the back and front fixed contacts of a relay 31 whose winding is energized, over a conductor 30, by the output of the differential detector 25. The moving contact of the relay 31 normally rests against the back fixed contact and so establishes a connection from the upper frequency meter 11 to the output conductor 6 of the apparatus. When the output of the upper frequency meter 11, after reduction to three-fourths of its value by the multiplier 19, exceeds the output of the lower frequency meter 12 and when, in addition, the output of the narrow band voicing indicator 17 has a substantial value, indicating that the energy in the auxiliary filter 5 is of a harmonic character rather than noise, then the differential detector 25 energizes the relay 31, disables the connection from the upper frequency meter 11 to the output conductor 6 and establishes, instead, a connection from the lower frequency meter 12 to the output conductor 6. The manner in which these connections ensure that the main filter shall track the fundamental component whenever it exists, instead of some higher harmonic, has been explained in connection with Fig. 1.

The broad band voicing indicator 3 may comprise a bandpass filter proportioned to pass energy in the range 100–1000 cycles per second, a rectifier and a low-pass filter proportioned to pass syllabic frequencies, connected together in the order named. The output of this voicing indicator may be applied to the winding of a relay 35 thus to energize it when the sound is voiced and hence to establish a path by way of the relay contacts, either from the upper frequency meter 11 or the lower one 12 to the output conductor 6. When, on the other hand, the sound is unvoiced, the relay winding is deenergized and the relay contacts open. Thereupon the potential most recently applied to the output conductor 6 remains stored on a condenser 37 so that the pitch signal, both as delivered to the outgoing line and as returned by the feedback path 7 to tune the filters 4, 5, is held throughout each unvoiced sound at its latest voiced sound value. The relay 35 and the condenser 37 thus carry out the operations required of the sample-and-hold circuit 16 of Fig. 1.

Figure 4:
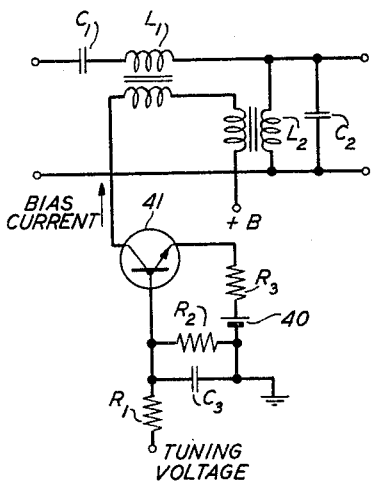

Each of the tunable bandpass filters 4, 5 may advantageously have the configuration shown in Fig. 4, essentially a series resonant circuit connected in tandem with a shunt resonant circuit. For the main tunable filter the magnitudes of the parameters are as follows:

$$L_1 = \frac{56}{(2.67+I)^{1.77}} \text{ henries}$$

$$L_2 = \frac{7.0}{(2.67+I)^{1.77}} \text{ henries}$$

$$C_1 = \tfrac{1}{2} \text{ mfd.}$$

$$C_2 = 4 \text{ mfd.}$$

$I$ = tuning control current in milliamperes

With these magnitudes, in the absence of any control current the main filter 4 is tuned to 70 cycles per second. The control winding of each of the coils $L_1$, $L_2$ may readily be coordinated with the range through which the control current changes and with the magnetic properties of the core so that the mid-band frequency of the main filter 4 is shifted upward on the frequency scale in a nearly linear fashion with change of bias current and by a factor of 4 for full bias current of 10 milliamperes. This suffices to embrace the range, i.e., 70–280 cycles per second, through which the fundamental frequencies of the voices of nearly all talkers, both male and female, extends.

The auxiliary filter 5, which has the same configuration as the main filter, may be caused to follow its prescribed half-frequency relation in various ways. Most simply, the capacitance of each condenser may be increased four-fold as compared with the capacitance of the corresponding condenser of the main filter, the unbiased inductance of each coil being the same as that of the corresponding coil of the main filter. With this arrangement the mid-band frequency of the auxiliary filter, before application of the bias current, is 35 cycles per second, i.e., one-half the mid-band frequency of the main filter before the application of bias current. Thereafter, increase of the bias current for the auxiliary filter at the same rate as that at which the main filter bias current increases maintains this half-frequency relation throughout the tuning range, i.e., from 35 cycles per second to 140 cycles per second.

The magnitudes of the individual filter bias currents for each single value of the frequency control voltage as applied to them by way of the feedback conductor 7 may readily be determined by selection of the magnitude of a bias potential source such as a battery 40 and of a load resistor $R_3$ connected in the emitter circuit of a transistor amplifier 41. The potential of the battery 40 determines the magnitude of the frequency control current for which bias current commences to flow; and the magnitude of the resistor $R_3$, as compared with the resistances of the control windings of the coils $L_1$ and $L_2$, determines the rate at which the bias current increases with increase of the frequency control voltage which is applied by way of a resistor $R_1$ to the base electrode of the transistor 41.

Fig. 5 shows the circuit details of a part of an actual embodiment of the invention which operates successfully. Here the transistor 50 plays the part of the amplifier 26 in the main channel, the transistor 51 plays the part of the amplifier 27 in the auxiliary channel and the transistor 52 plays the part of the amplifier 22 shown in Fig. 3 connected to the output point of the narrow band voice indicator 17. The transistor 53 operates merely as a phase inverter. The transistors 54 and 55, connected as shown, play the part of the differential detector 25 of Fig. 3. A voltage divider 56 carries out the required multiplication of the output of the transistor 50 by the factor 3/4. From the output connections of the differential detector 54, 55 and the combination therewith of the signal from the phase inverter 53, applied by way of the enabling conductor 18, the potential of the output conductor 30 of the differential detector 25 which is applied in Fig. 3 to the winding of the relay 31, rises or falls as required to operate two further transistors 58, 59 to disable the main filter path and enable the auxiliary filter path, or vice versa, as required to carry out the operations described above. For the rest, the mode of operation of the circuit of Fig. 5 is believed to be self-evident.

Reference is made to a copending application of C. B. H. Feldman and A. C. Norwine, Serial No. 566,152, filed February 17, 1956 which approaches the problem of tracking the frequency of the fundamental component of a complex wave in the course of its variations by a different avenue. That application has now matured into Patent 2,859,405, granted November 4, 1958.

What is claimed is:

1. Apparatus for tracking the fundamental frequency component of a complex wave of varying frequency in the presence of harmonic components of said wave, which comprises a bandpass filter having an input terminal, an output terminal and a control terminal and being tunable conformably with a control signal by application of said control signal to said control terminal, means for applying said complex wave to the input terminal of said filter, means connected to the output terminal of said filter for deriving a first control signal representative of the frequency of wave energy transmitted through said filter, means for feeding back said control signal to the control terminal of said filter, thereby to shift the passband of said filter to embrace said frequency, means for monitoring that part of the frequency range of said complex wave lying below the passband of said filter, for recognizing the presence of energy of frequency lower than any within said passband and for deriving a second control signal representative of the frequency of said lower-frequency energy, and means, responsive to said lower-frequency energy, for applying said second control signal to said control terminal, thereby further to shift the passband of said filter to embrace said lower frequency.

2. Apparatus as defined in claim 1 wherein said monitoring means comprises an auxiliary filter having an input terminal, an output terminal and a control terminal and being tunable by application of said control signal to its control terminal to a frequency substantially lower than that to which the first-named filter is tuned, means for supplying said complex wave to the input terminal of said auxiliary filter, means connected to the output terminal of said auxiliary filter for deriving a second control signal representative of the frequency of wave energy transmitted through said auxiliary filter, and means for feeding back said second control signal to the control terminals of both of said filters, to tune both of said filters downward on the frequency scale.

3. Apparatus as defined in claim 2 wherein said auxiliary filter is proportioned to pass, with minimum loss, a component of one-half the frequency to which the first-named filter is tuned.

4. In combination with apparatus as defined in claim 2, means for selecting a single one of said first and second control signals.

5. In combination with apparatus as defined in claim 2, means responsive to the presence of wave energy within the passband of said auxiliary filter for selecting the second of said control signals.

6. In combination with apparatus as defined in claim 5, means responsive to the presence of substantial amounts of enharmonic energy at the input terminal of said auxiliary filter for disabling said selecting means.

7. In combination with apparatus as defined in claim 2, means responsive to the presence within the passband of said auxiliary filter of an energy component of which the frequency is harmonically related to the frequency of an energy component within the passband of said first-named filter for selecting the second of said control signals.

8. Apparatus for tracking the fundamental frequency component of a complex wave in the presence of harmonic components of said wave, which comprises a main filter having an input terminal, an output terminal and a control terminal and being tunable conformably with a control signal by application of said control signal to said control terminal, an auxiliary filter having an input terminal, an output terminal and a control terminal and being tunable, by application of said control signal to said last-named control terminal, to a frequency substantially one-half of the frequency to which said main filter is tuned, means for supplying said complex wave to the input terminals of both of said filters, means connected to the output terminal of said main filter for deriving a first control signal representative of the frequency of wave energy transmitted through said main filter, means connected to the output terminal of said auxiliary filter for deriving a second control signal representative of the frequency of wave energy passing through said auxiliary filter, means responsive to the relative energies of said first and second control signals for selecting one of said control signals, and means for feeding back said selected control signal to the control terminals of both of said filters, thereby to tune said main filter to the frequency represented by said selected control signal and to tune said auxiliary filter to one-half of said represented frequency.

9. Apparatus for tracking the fundamental frequency component of a complex wave in the presence of harmonic components of said wave, which comprises a main filter having an input terminal, an output terminal and a control terminal and being tunable conformably with a control signal by application of said control signal to said control terminal, an auxiliary filter having an input terminal, an output terminal and a control terminal and being tunable, by application of said control signal to said last-named control terminal, to a frequency substantially one-half of the frequency to which said main filter is tuned, means for supplying said complex wave to the input terminals of both of said filters, means connected to the output terminal of said main filter for deriving an auxiliary signal representative of the frequency of wave energy passing through said main filter, means for deriving from said auxiliary signal a first control signal proportional to three-fourths of the frequency of wave energy passing through said main filter, means connected to the output terminal of said auxiliary filter for deriving a second control signal similarly proportional to the frequency of wave energy passing through said auxiliary filter, means responsive to the relative energies of said first and second control signals for selecting one of said control signals, and means for feeding back said selected control signal to the control terminals of both of said filters, thereby to tune said main filter to the frequency represented by said selected control signal and to tune said auxiliary filter to one-half of said represented frequency.

10. Apparatus for tracking the fundamental frequency component of a speech wave of varying frequency and varying energy in the presence of harmonic components of said wave, which comprises a bandpass filter having an input terminal, an output terminal and a control terminal and being tunable conformably with a control signal by application of said control signal to said control terminal, means for applying said speech wave to the input terminal of said filter, means connected to the output terminal of said filter for deriving a first control signal representative of the frequency of wave energy transmitted through said filter, means for feeding back said control signal to the control terminal of said filter, thereby to shift the passband of said filter to embrace said frequency, means for monitoring that part of the frequency range of said speech wave lying below the passband of said filter for recognizing the presence of energy of frequency lower than any within said passband and for deriving a second control signal representative of the frequency of said lower-frequency energy, means responsive to said lower-frequency energy for applying said second control signal to said control terminal, thereby further to shift the passband of said filter to embrace said lower frequency, and means, responsive to failure of fundamental frequency energy of said speech wave for holding said control signal, throughout the duration of each such failure, at the magnitude that it had immediately prior to such failure.

References Cited in the file of this patent

UNITED STATES PATENTS

| | | |
|---|---|---|
| 1,647,270 | Burton | Nov. 1, 1927 |
| 2,054,892 | Braden | Sept. 22, 1936 |
| 2,084,379 | Braden | June 22, 1937 |
| 2,640,880 | Aigrain | June 2, 1953 |